E. H. McCLOUD.
BRAKE FOR FIRE SHUTTERS.
APPLICATION FILED JULY 17, 1915.
1,180,265.
Patented Apr. 18, 1916.
2 SHEETS—SHEET 1.
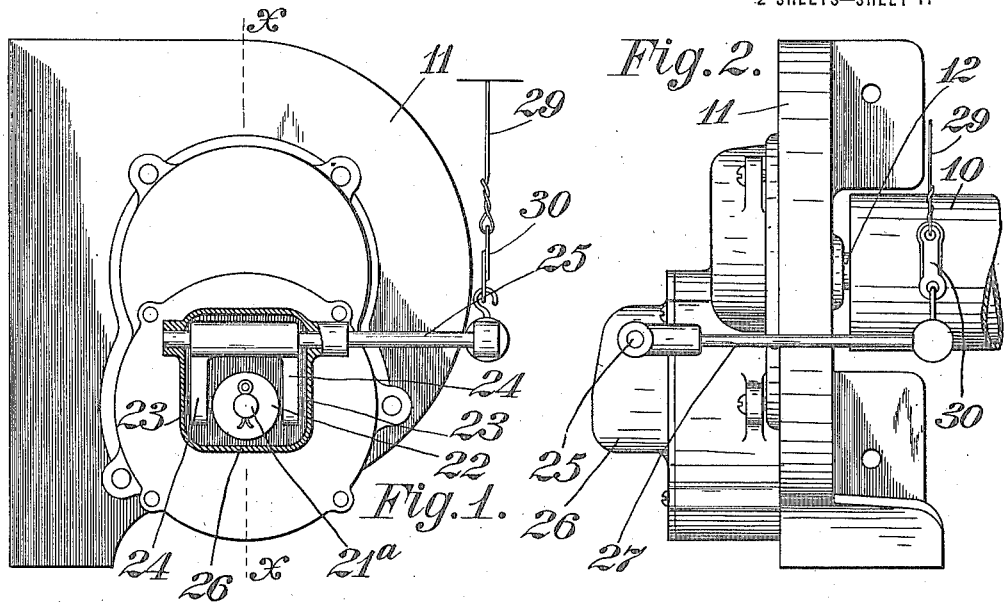
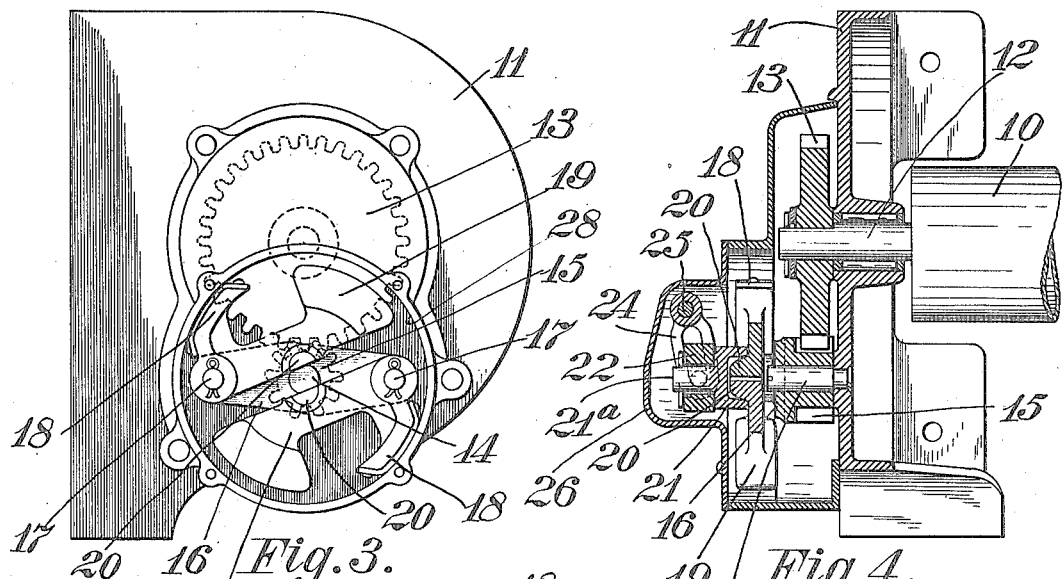
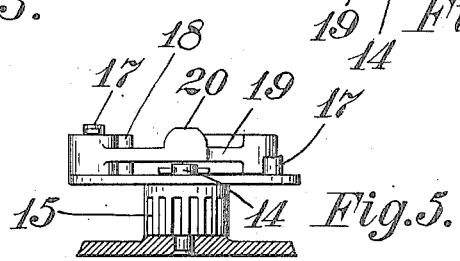
Witness
Benjamin Finckel
Inventor
Edward H. McCloud
By
his Attorneys E. H. McCLOUD.
BRAKE FOR FIRE SHUTTERS.
APPLICATION FILED JULY 17, 1915.

1,180,265.

Patented Apr. 18, 1916.
2 SHEETS—SHEET 2.

Witness
Benjamin Finckel

Inventor
Edward H. McCloud
By
his Attorneys

UNITED STATES PATENT OFFICE.

EDWARD H. McCLOUD, OF COLUMBUS, OHIO.

BRAKE FOR FIRE-SHUTTERS.

1,180,265.  Specification of Letters Patent.  Patented Apr. 18, 1916.

Application filed July 17, 1915. Serial No. 40,532.

*To all whom it may concern:*

Be it known that I, EDWARD H. McCLOUD, a citizen of the United States, residing at Columbus, in the county of Franklin and State of Ohio, have invented a certain new and useful Improvement in Brakes for Fire-Shutters, of which the following is a specification.

This invention relates more particularly to that class of automatically closing fire shutters in which the curtain is normally balanced for raising and lowering and the invention has for its object to provide an improved brake adapted to operate when the curtain is automatically released for closing.

The invention is embodied in the example shown in the accompanying drawings and set forth in the following specification.

Figure 6:
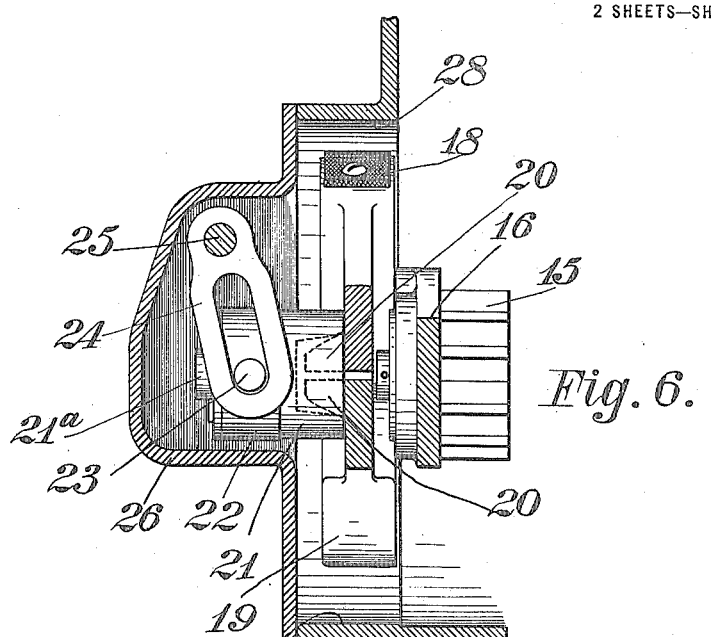
Figure 7:
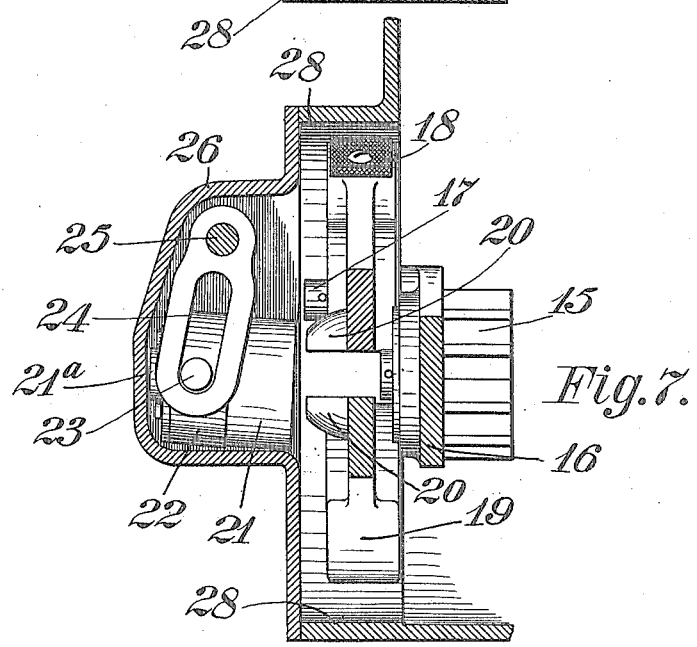

In said drawings—Figure 1 is a view in end elevation, with a portion of the brake mechanism cover broken out showing the brake shoe latching device. Fig. 2 is a front view. Fig. 3 is a view like Fig. 1 with the covers and the brake shoe latching device removed. Fig. 4 is a section on the line x—x Fig. 1. Fig. 5 is a detail of a portion of the brake mechanism. Figs. 6 and 7 are details in full and sectional lines showing the latched and unlatched positions of the brake shoe levers.

In the views 10 designates one end of the curtain roller and 11 an end bracket for supporting the shaft 12 of said end of the curtain roller. Secured on the end of the said shaft where it projects beyond the bracket is a spur gear wheel 13. Journaled on a pin 14 projecting from the outer side of the bracket and below the gear wheel is a pinion 15 having a cross arm or frame 16. The said cross frame is provided at its opposite ends with fulcrum pins 17 upon which are mounted centrifugal levers having brake shoe arms 18 and weighted arms 19. Each of the arms 19 is provided near its middle with a semiconical projection 20 adapted to be embraced by a cup 21 having a shaft 21ª journaled in and carried by a collar 22. The collar 22 has oppositely projecting pins 23 engaged by the slotted arms 24 of a yoke pivoted by means of a rock shaft 25 journaled in a cover 26 for the mechanism. One end of the shaft 25 projects forward beyond the bracket 11 where it is provided with a gravity arm 27.

When slightly spread apart the brake shoes contact frictionally with the circular internal rim 28 formed as a portion of the cover for the mechanism. To hold the shoes removed from the rim 28 the levers are brought together and the cup 21 shoved inward to embrace the semi-conical projections 20. In this position of the cup 21 the gravity arm is raised to horizontal position where it is retained by a wire containing a member 30 fusible by an abnormal rise of temperature such as would be caused by a dangerously nearby fire. The wire 30 is attached to any suitable fixed point near or upon the building to be protected. The release of the brake members is thus automatically thermally controlled.

In the normal operation of the shutter or curtain the brake members are revolved by the rotation of the meshing gear and pinion either in the cup or, if the conical projections 20 be sufficiently pinched, with the cup and its shaft 21ª in the collar 22. The shutter as before indicated is also provided with means for releasing it. The same fusing device may be used for both purposes. Such means are not shown because they are well understood. But simultaneously or nearly simultaneously with the release of the shutter in case of fire the brake holding cup 21 is also released by the fusing of the member 30 thereby releasing the brake levers and permitting the brake shoes to frictionally engage the rim 28 under the influence of centrifugal action. Because the centrifugal action and friction are increased with an increase of speed the descent of the shutter is automatically controlled.

The forms of the parts can be modified without departing from the gist of the invention as claimed.

What I claim is—

1. The combination with a normally operative fire shutter or curtain, of a brake for controlling the descent of the shutter or curtain actuated by the shutter mechanism and means for latching said brake from effective operation during normal operation of the shutter or curtain.

2. The combination with a normally operative fire shutter or curtain, of a brake including a centrifugally actuatable lever for controlling the descent of the shutter or curtain operated by the shutter mechanism, and means for latching said brake from effectual operation during normal operation of the shutter.

3. The combination with a normally operative fire shutter or curtain, of a brake including a pair of centrifugally actuatable levers controlling the descent of the shutter or curtain operated by the shutter mechanism, and means for latching said brake from effectual operation during normal operation of the shutter.

4. The combination with a normally operative fire shutter or curtain, of a brake for controlling the descent of the shutter or curtain actuated by the shutter mechanism and thermally controlled means for latching said brake from effective operation during normal operation of the shutter or curtain.

5. The combination with a normally operative fire shutter or curtain, of a brake comprising a pair of centrifugally actuated arms, a projection from said arms, a slidable member to engage said projection to latch the brake arms from effectual operation, and thermally controlled means for holding said slidable member so engaged.

6. The combination with a normally operative fire shutter or curtain, of a brake comprising a pair of centrifugally actuated arms, a projection from said arms, a slidable and rotary member to engage said projection to latch the brake arms from effectual operation, and thermally controlled means for holding said slidable member so engaged.

7. The combination with a normally operative fire shutter or curtain, of a brake member for controlling the descent of the shutter or curtain centrifugally actuated by the shutter or curtain mechanism and means for latching the brake member from effective operation during normal operation of the shutter or curtain.

8. The combination with a normally operative fire shutter or curtain, of a brake member for controlling the descent of the shutter or curtain centrifugally actuated by the shutter or curtain mechanism and thermally controlled means for latching the brake member from effective operation during normal operation of the shutter or curtain.

EDWARD H. McCLOUD.

Witnesses:
 ELIZABETH M. WEISZ,
 ALBERT KURL.